US006912640B2

United States Patent
Allison et al.

(10) Patent No.: US 6,912,640 B2
(45) Date of Patent: Jun. 28, 2005

(54) METHOD TO PARTITION LARGE CODE ACROSS MULTIPLE E-CACHES

(75) Inventors: David S. Allison, San Ramon, CA (US); Deepankar Bairagi, Davis, CA (US); Jeffrey M. Broughton, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 299 days.

(21) Appl. No.: 10/389,270

(22) Filed: Mar. 14, 2003

(65) Prior Publication Data

US 2004/0181786 A1 Sep. 16, 2004

(51) Int. Cl.[7] .............................................. G06F 12/00
(52) U.S. Cl. ...................... 711/170; 707/159; 707/161; 707/162; 711/171; 711/172; 711/173
(58) Field of Search ................................ 717/159–161; 711/170–173

(56) References Cited

U.S. PATENT DOCUMENTS

| | | | | |
|---|---|---|---|---|
| 5,333,297 A | * | 7/1994 | Lemaire et al. ............. | 710/200 |
| 5,822,570 A | * | 10/1998 | Lacey .......................... | 703/26 |
| 6,308,257 B1 | * | 10/2001 | Theogarajan et al. ....... | 712/210 |
| 6,658,551 B1 | * | 12/2003 | Berenbaum et al. .......... | 712/24 |
| 6,742,111 B2 | * | 5/2004 | Soni ............................ | 712/217 |
| 6,813,702 B1 | * | 11/2004 | Ramey et al. ................ | 712/23 |
| 6,826,676 B2 | * | 11/2004 | Wishneusky ................ | 712/210 |

* cited by examiner

Primary Examiner—T Nguyen
(74) Attorney, Agent, or Firm—Osha Liang LLP (57) ABSTRACT

A method for executing an instruction stream includes partitioning the instruction stream using a partition point to obtain a first partition of the instruction stream and a second partition of the instruction stream, configuring the first partition and the second partition to fit separate e-caches, analyzing the first partition and the second partition to generate a runtime execution facility and a data transfer facility, and executing the first partition and the second partition on separate processors using the runtime execution facility and the data transfer facility.

24 Claims, 8 Drawing Sheets

METHOD TO PARTITION LARGE CODE ACROSS MULTIPLE E-CACHES

BACKGROUND OF INVENTION

Access to computer resources, such as program instructions in memory, which is accessed by multiple threads, may be controlled by use of a semaphore. For example, POST and WAIT instructions may be used to allow exclusive access to an area of memory when two threads, thread A and thread B, are both executing. When a thread gains access to the area of memory, a WAIT instruction is executed, which prevents thread B from gaining access to the area of memory until thread A has completed accessing the area of memory. When thread A is finished accessing the area of memory, a POST instruction is executed, and thread B is able to access the area of memory.

Figure 1:
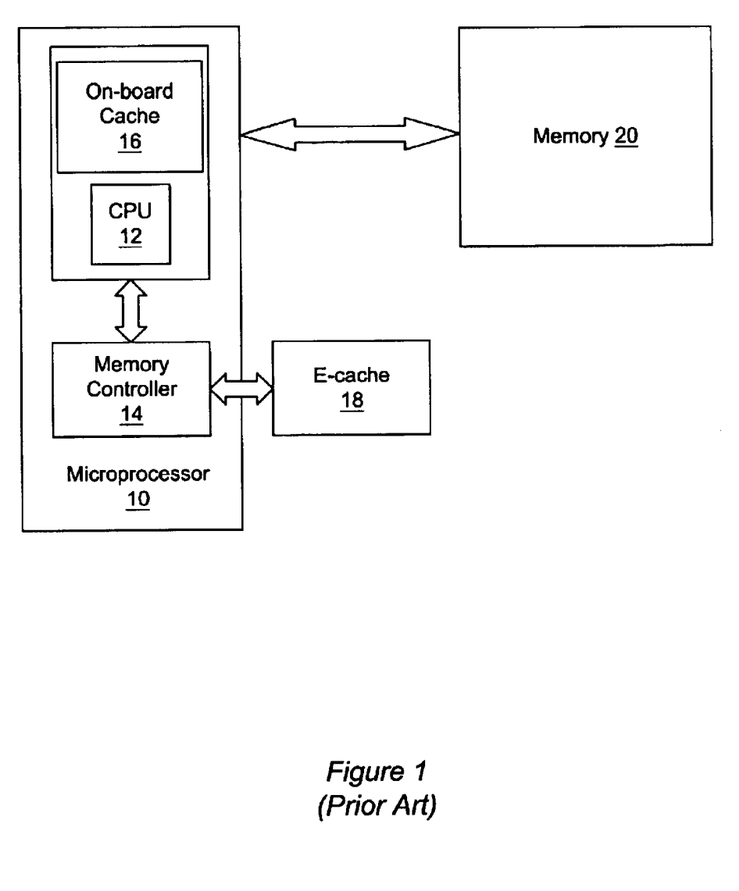
FIG. 1 shows components of a typical computer system.

Referring to FIG. 1, a typical computer system upon which threading may be implemented includes a microprocessor (10) having, among other things, a CPU (12), a memory controller (14), and an on-board cache memory (16). The microprocessor (10) is connected to external cache memory ("e-cache") (18) and memory (20) that holds data and program instructions to be executed by the microprocessor (10). Internally, the execution of program instructions is carried out by the CPU (12). Data needed by the CPU (12) to carry out an instruction is retrieved by the memory controller (14). Upon command from the CPU (12), the memory controller (14) searches for the data first in the on-board cache memory (20), next in the e-cache (18), and finally in the memory (20). Finding the data in the cache memory is referred to as a "hit." Not finding the data in the cache memory is referred to as a "miss."

The rate of hits and misses ("hit rate" and "miss rate") depends, in no small part, on the caching scheme or policy employed by the computer system, e.g., direct-mapped or set associative. For some computer applications, a direct-mapped policy may provide better system performance due to a better hit rate, and for other computer applications, a set associative caching scheme may prove more beneficial. This performance variation depends on such details as the address sequences used by the application, the allocation of memory pages to an application by the operating system, and whether virtual or physical addresses are used for addressing the cache, etc.

Figure 2:
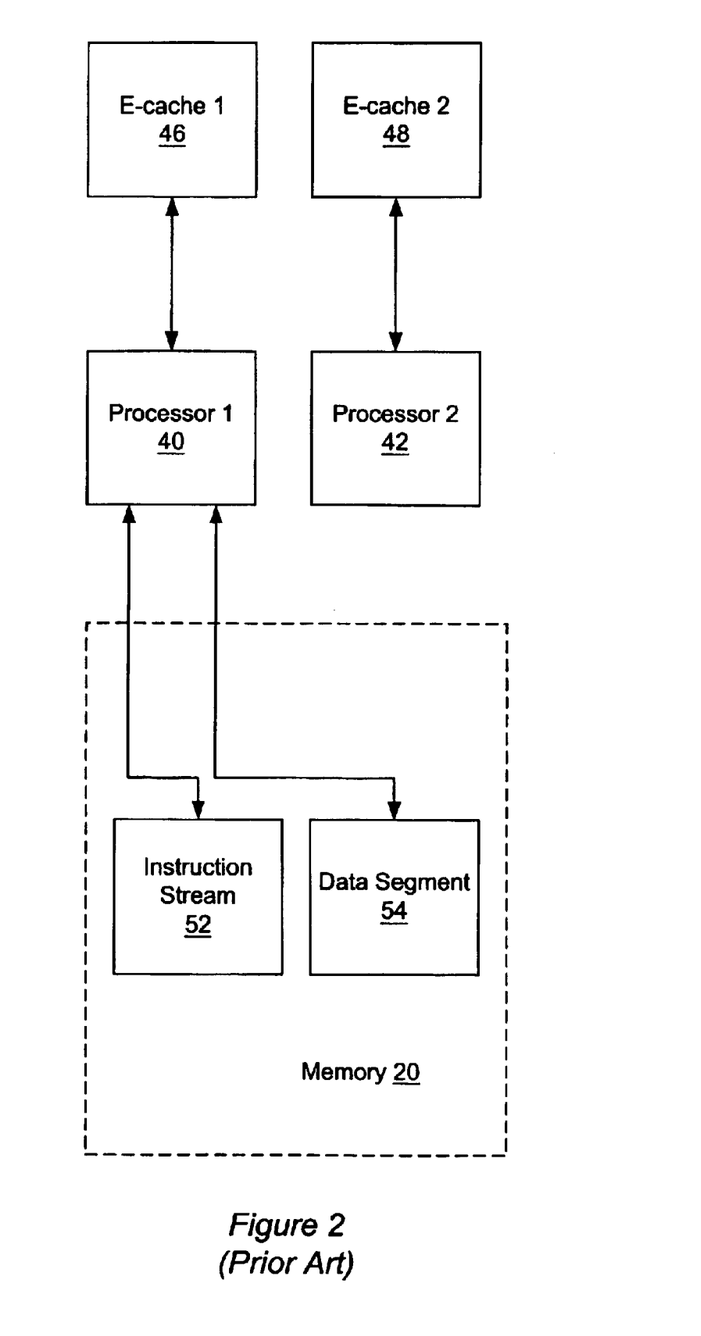
FIG. 2 shows a multiple-processor architecture.

Caching schemes are also used in multiple-microprocessor computer architectures. FIG. 2 shows a multiple-processor computer architecture using processor 1 (40) and processor 2 (42). Processor 1 (40) and processor 2 (42) may include standard components, such as a CPU, a memory controller, and an on-board cache memory. Processor 1 (40) and processor 2 (42) are each connected to an associated e-cache memory. Processor 1 (40) is associated with e-cache 1 (46), processor 2 (42) is associated with e-cache 2 (48). Each processor may execute a program in the form of an instruction stream, which is located in memory (20). For example, processor 1 (40) may execute the instruction stream (52), and access a data segment (54) while executing the instruction stream (52).

Figure 3:
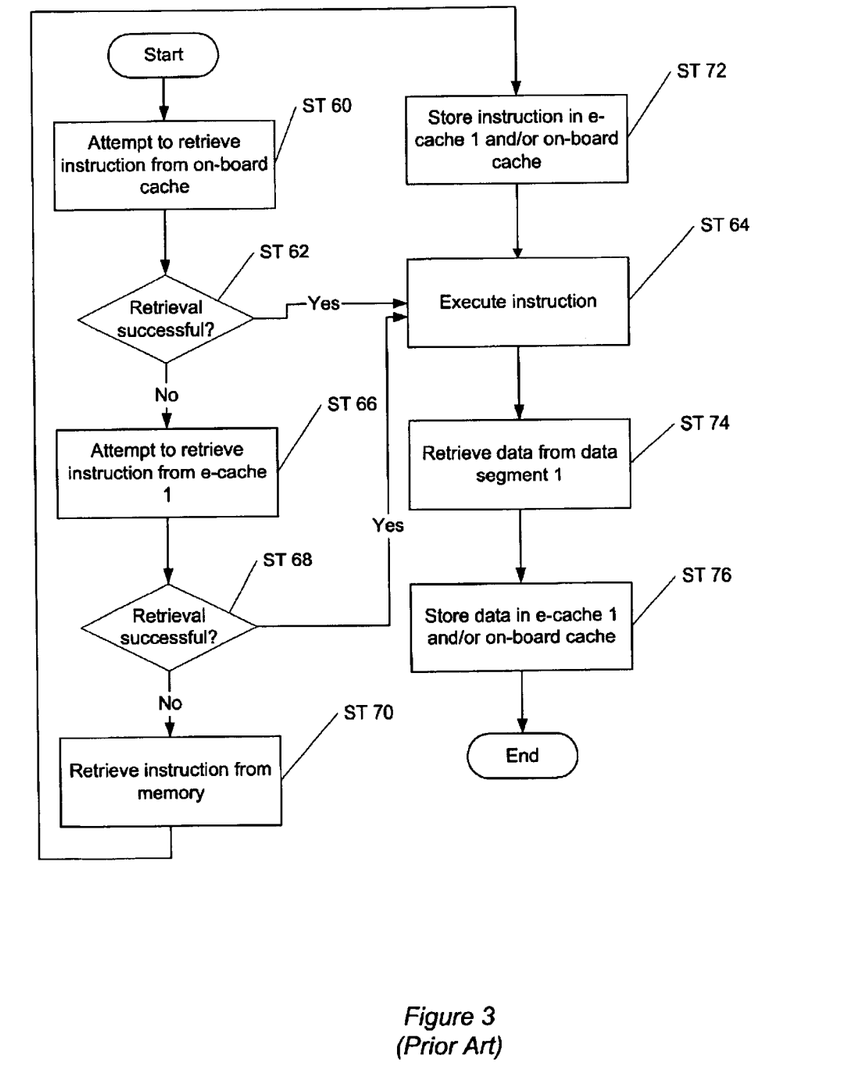
FIG. 3 shows a flowchart with exemplary operations relevant to execution of an instruction stream.

FIG. 3 shows a flowchart with exemplary operations relevant to the execution of an arbitrary instruction of the instruction stream (52) by the processor 1 (40) using the computer architecture shown in FIG. 2. First, processor 1 makes an attempt to retrieve the instruction from the on-board cache (Step 60). A determination is then made as to whether the attempted retrieval from the on-board cache is successful (Step 62). If the attempted retrieval from the on-board cache is successful, the instruction is executed (Step 64). Otherwise, processor 1 makes an attempt to retrieve the instruction from the e-cache 1 (Step 66).

A determination is then made as to whether the attempted retrieval from the e-cache 1 is successful (Step 68). If the attempted retrieval from the e-cache 1 is successful, the instruction is executed (Step 64). Otherwise, the instruction is retrieved from memory (Step 70). The instruction is then stored in the e-cache 1 and/or the on-board cache (depending on the particular caching implementation and policy) (Step 72). Processor 1 then executes the instruction (Step 64). After execution, processor 1 then retrieves data from the data segment (Step 74) and the data is stored in the e-cache 1 (Step 76). Those skilled in the art will appreciate that the steps shown in FIG. 3 are likely to be performed repeatedly during execution of a software program, which includes numerous instructions.

A size of the instruction stream may be larger than a fixed size of the e-cache 1. For example, the size of the e-cache 1 may be 8 megabytes (8 M) in size, and the size of the instruction stream 1 may be 10 M in size. Therefore, after 8 M of instructions from the instruction stream 1 have been stored in the e-cache 1 from the memory, depending upon how caching is implemented, the necessary subsequent retrievals of instructions may result in a cache miss, which requires retrieval of the instruction from memory, resulting in slower execution of the program.

SUMMARY OF INVENTION

In general, in one aspect, the invention relates to a method for executing an instruction stream. The method comprises partitioning the instruction stream using a partition point to obtain a first partition of the instruction stream and a second partition of the instruction stream, configuring the first partition and the second partition to fit separate e-caches, analyzing the first partition and the second partition to generate a runtime execution facility and a data transfer facility, and executing the first partition and the second partition on separate processors using the runtime execution facility and the data transfer facility, wherein the second partition executes after the first partition.

In general, in one aspect, the invention relates to a method for executing an instruction stream. The method comprises partitioning the instruction stream using a partition point to obtain a first partition of the instruction stream and a second partition of the instruction stream, configuring the first partition and the second partition to fit separate e-caches, analyzing the first partition and the second partition to generate a runtime execution facility and a data transfer facility, executing the first partition and the second partition on separate processors using the runtime execution facility and the data transfer facility, retrieving the first partition and the second partition from the memory, storing the first partition and the second partition in the separate e-caches, aligning a data segment in the memory, and retrieving the first partition and the second partition from the separate e-caches.

In general, in one aspect, the invention relates to a system for executing an instruction stream. The system comprises a partitioning program configured to partition the instruction stream into a first partition of the instruction stream and a second partition of the instruction stream, store the first partition at a first address in a memory, and store the second partition at a second address in the memory, wherein the first partition and the second partition are fitted to separate e-caches by the partitioning program, a runtime execution facility configured to enforce execution order of the first partition and the second partition, and a data transfer facility configured to transfer data required by execution of the second partition and supplied by execution of the first partition.

In general, in one aspect, the invention relates to a system for executing an instruction stream. The system comprises a partitioning program configured to partition the instruction stream into a first partition of the instruction stream and a second partition of the instruction stream, store the first partition at a first address in a memory, and store the second partition at a second address in the memory, wherein the first partition and the second partition are fitted to separate e-caches by the partitioning program, a runtime execution facility configured to enforce execution order of the first partition and the second partition, a data transfer facility configured to transfer data required by execution of the second partition and supplied by execution of the first partition, and a data segment in memory aligned with a third address in the memory.

In general, in one aspect, the invention relates to an apparatus for executing an instruction stream. The apparatus comprises means for partitioning the instruction stream using a partition point to obtain a first partition of the instruction stream and a second partition of the instruction stream, means for configuring the first partition and the second partition to fit separate e-caches, means for analyzing the first partition and the second partition to generate a runtime execution facility and a data transfer facility, and means for executing the first partition and the second partition on separate processors using the runtime execution facility and the data transfer.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 4:
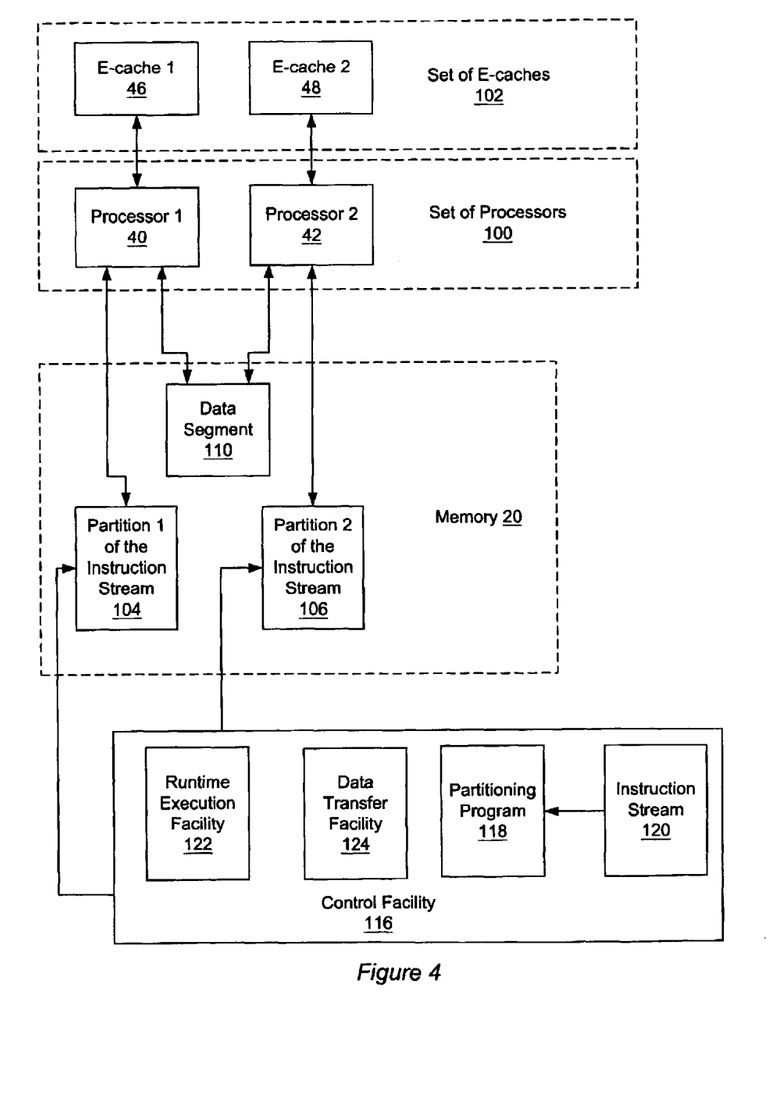
FIG. 4 shows a system for executing an instruction stream on a set of processors using a plurality of e-caches, in accordance with an embodiment of the invention.

One or more aspects of the invention relate to improving performance of execution of an instruction stream using multiple processors and multiple e-caches. A system for executing an instruction stream on a set of processors using a plurality of e-caches is shown in FIG. 4. A set of processors (100) includes processor 1 (40) and processor 2 (42). Although FIG. 4 shows a system with two processors, those skilled in the art will appreciate that more than two processors may be used. Each processor of the set of processors (100) is associated with a particular e-cache of a set of e-caches (102). For example, processor 1 (40) is associated with e-cache 1 (46), and processor 2 (42) is associated with e-cache 2 (48).

In accordance with an embodiment of the invention, each processor of the set of processors (100) is associated with a single partition of the instruction stream stored in a memory (20). Partition 1 (104) of the instruction stream and partition 2 (106) of the instruction stream are stored in the memory (20). In accordance with an embodiment of the invention, each processor of the set of processors (100) is associated with multiple partitions of the instruction stream stored in the memory (20).

Included in the memory (20) is a data segment (110). The data segment (110) may be associated with one or more processors of the set of processors (100). For example, the data segment (110) is associated with processor 1 (40) and processor 2 (42).

In accordance with one or more embodiments of the invention, an address of the data segment (110) is aligned with an address of a partition of the instruction stream. For example, the data segment (110) may have a starting address of 10001H (in hex notation), and partition 1 (104) of the instruction stream may have an ending address of 10000H. Therefore, the starting address of the data segment (110) is aligned with the next page (i.e., a next page boundary in the memory (20)) after the ending address of the partition 1 (104) of the instruction stream.

A control facility (116) includes a partitioning program (118), an instruction stream (120), a runtime execution facility (122), and a data transfer facility (124). Partition 1 (104) of the instruction stream and partition 2 (106) of the instruction stream are generated from the (original) instruction stream (120). The partitioning program (118) partitions the instruction stream (120) to generate partition 1 (104) of the instruction stream and partition 2 (106) of the instruction stream. Each partition is fitted for a particular e-cache of the set of e-caches (102), with respect to a size of the partition and a size of the e-cache.

The runtime execution facility (122) controls execution of partition 1 (104) of the instruction stream and partition 2 (106) of the instruction stream by selected processors of the set of processors (100) using instructions placed into partition 1 (104) of the instruction stream and partition 2 (106) of the instruction stream. The runtime execution facility (122) controls an order of execution of the partition 1 (104) of the instruction stream and partition 2 (106) of the instruction stream by the selected processors of the set of processors (100).

For example, the runtime execution facility (122) may require that processor 2 (42) execute the instructions of partition 2 (106) of the instruction stream only after processor 1 (40) has completed executing the instructions of partition 1 (104) of the instruction stream. Alternatively, while processor 2 (42) waits for completion of execution of partition 1 (104) of the instruction stream, another partition may execute on processor 2 (42). In accordance with one or more embodiments of the invention, the runtime execution facility (122) includes instructions for implementing semaphore techniques by including POST and WAIT instructions into partition 1 (104) of the instruction stream and partition 2 (106) of the instruction stream.

The data transfer facility (124) facilitates transfer of data required by execution of a first partition (e.g., partition 2 (106) of the instruction stream) which is supplied by the execution of a second partition (e.g., partition 1 (104) of the instruction stream). A partition spill in the memory (20) may be used for storing such transferred data. For example, execution of partition 2 (106) of the instruction stream may include a LOAD instruction to obtain the value of a variable, which was placed in the partition spill in the memory (20) by execution of a STORE instruction included in partition 1 (104) of the instruction stream.

Figure 5:
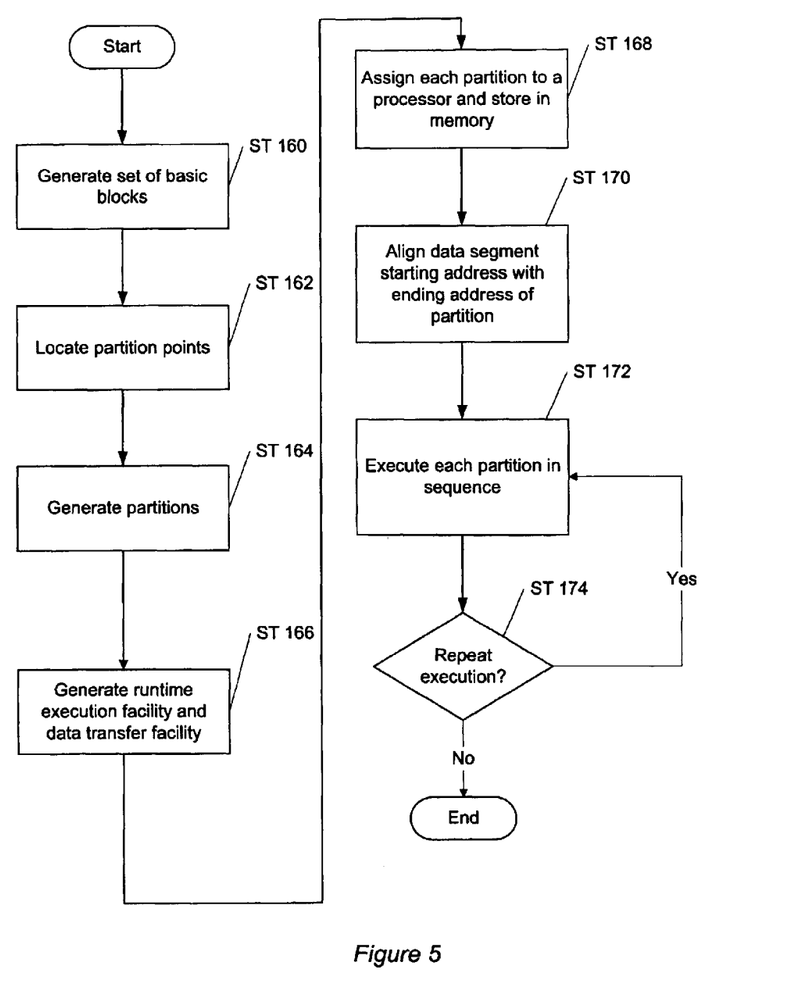
FIG. 5 shows a flowchart for executing the instruction stream using the set of processors and the plurality of e-caches, in accordance with an embodiment of the invention.

A flowchart for executing the partition 1 (104) of the instruction stream and partition 2 (106) of the instruction stream using processors of the set of processors (100) and e-caches of the set of e-caches (102) is shown in FIG. 5. A first step is generating a set of basic blocks (an instruction or sequence of instructions that may have a single branching instruction at the end) from the instruction stream by analyzing the instruction stream using the partitioning program (Step 160). For example, a basic block analysis may be used to analyze the instruction stream. Those skilled in the art will appreciate that multiple techniques for basic block analysis may be used. Once the set of basic blocks has been generated, one or more partition points is located (Step 162).

A partition point is defined as an instruction in a stride block. A stride block is a basic block that is unconditionally executed. Those skilled in the art will appreciate that multiple techniques may be used to locate partition points. For example, each basic block may be considered in turn, and evaluated as to whether the particular basic block is a stride block.

Once one or more partition points have been located, partition 1 of the instruction stream and partition 2 of the instruction stream are generated using the partition points and the instruction stream (Step 164).

In accordance with an embodiment of the invention, partition 1 of the instruction stream and partition 2 of the instruction stream are generated by finding a stride block and a split in the stride block. In accordance with an embodiment of the invention, a ratio of a size of each partition to a size of a corresponding e-cache is 5.4 to 8.0. For example, e-cache 1 may have a size of 8 M, and partition 1 (104) of the instruction stream may have a size of 5.4 M.

Figure 6:
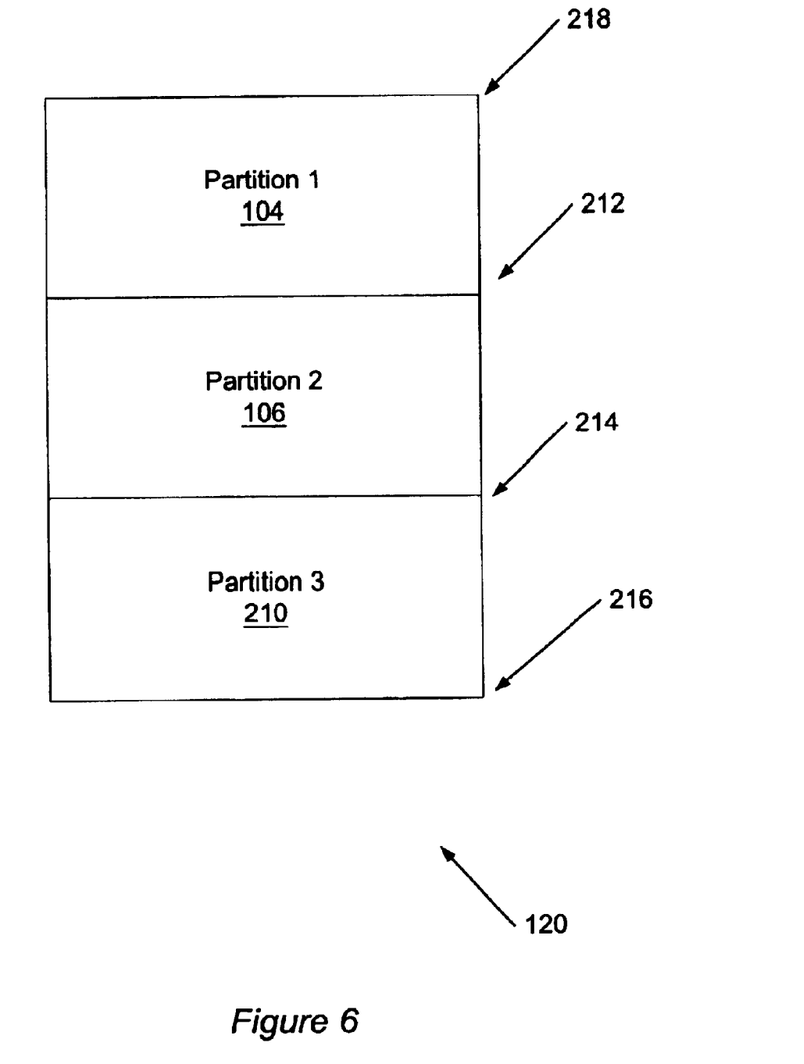
FIG. 6 shows an exemplary instruction stream partitioned into a set of partitions of the instruction stream, in accordance with an embodiment of the invention.

FIG. 6 shows an exemplary instruction stream (120) partitioned into partition 1 (104) of the instruction stream, partition 2 (106) of the instruction stream, and partition 3 (210) of the instruction stream. Partition point 1 (212), partition point 2 (214), and partition point 3 (210) mark the end of partition 1 (104) of the instruction stream, partition 2 (106) of the instruction stream, and partition 3 (210) of the instruction stream, respectively. A beginning (218) of the instruction stream (120) marks the beginning of partition 1 (104) of the instruction stream.

Referring back to FIG. 5, once the set of partitions has been generated, the runtime execution facility and the data transfer facility are generated by analyzing each partition of the set of partitions (Step 166). The runtime execution facility ensures an order of execution of partition 1 (104) of the instruction stream and partition 2 (106) of the instruction stream, i.e., enforces a proper sequence of execution for partition 1 (104) of the instruction stream and partition 2 (106) of the instruction stream. For example, referring to FIG. 6, in accordance with an embodiment of the invention, execution of partition 2 (106) of the instruction stream requires that partition 1 (104) of the instruction stream has already completed execution, and execution of partition 3 (210) of the instruction stream requires that partition 2 (106) of the instruction stream has already completed execution. Those skilled in the art will appreciate that well-established prior art techniques, e.g., a control flow graph, etc., may be used to determine the order of execution.

In order to enforce the order of execution, in accordance with an embodiment of the invention, the runtime execution facility includes instructions to implement semaphore functionality for partition 1 (104) of the instruction stream and partition 2 (106) of the instruction stream. For example, the runtime execution facility may include a semaphore WAIT instruction added to the beginning of partition 2 (106) of the instruction stream and a semaphore POST instruction added to the end of partition 1 (104) of the instruction stream in order to cause execution of partition 2 (106) of the instruction stream to wait until partition 1 (104) of the instruction stream has completed execution. Those skilled in the art will appreciate that other techniques may be used to enforce the order of execution on multiple processors.

In accordance with an embodiment of the invention, each partition executes within a thread associated with the partition. Therefore, the runtime execution facility may include instructions sufficient to acquire computer system resources for instantiation, initialization, set-up, etc., of each thread. Those skilled in the art will appreciate that well-established techniques exist for acquiring computer resources for execution of multiple threads.

Referring to FIG. 5, once generated, the data transfer facility enables a transfer of data supplied by execution of one partition and required for execution of another partition. For example, referring to the previous example where execution of partition 2 of the instruction stream waits until partition 1 of the instruction stream has completed execution, execution of partition 1 of the instruction stream may change or generate a value of a particular variable. However, the value of the variable may be required during execution of partition 2 of the instruction stream. The data transfer facility arranges for transfer and storage of the value of the variable so that the value of the variable is available for use during execution of partition 2 of the instruction stream.

In accordance with an embodiment of the invention, the data transfer facility includes a partition spill in main memory to store data (e.g., the value of the variable), a STORE instruction, and a LOAD instruction. The STORE instruction is located in the particular partition whose execution supplies the data. The LOAD instruction is located in the particular partition whose execution requires the data.

Thus, during execution of the supplying partition, the transferred data, e.g., the value of the variable, is stored in the partition spill by the STORE instruction, which is included in the supplying partition as part of the data transfer facility. When the partition that requires the data is executed, the LOAD instruction, which is included in the requiring partition as part of the data transfer facility, transfers the data from the partition spill to an accessible location. For example, the LOAD instruction may transfer the data to a register associated with the processor upon which the requiring partition is executing.

Once the execution runtime facility and the data transfer facility are generated, each partition is assigned to a particular processor and stored in the memory (Step 168). In accordance with an embodiment of the invention, each partition is assigned randomly to a processor. Those skilled in the art will appreciate that other algorithms may be used to assign partitions to a processor.

In order to enhance performance of a particular partition executing on a particular processor, the starting address of the data segment used by the processor is aligned with the ending address of a corresponding partition stored in the memory (Step 170). For example, the starting address in memory of the data segment (which may be associated with processor 1) may be equal to 8000H (in hex notation), and the last instruction of the partition 1 of the instruction stream may be stored in a memory address of 10000H. In order to align the data segment with the ending address of the partition 1 of the instruction stream, the data segment is relocated from its present location in memory to a location in memory where the starting address of the data segment is equal to the address of the page in memory following 10000H. Thus, the starting address of the data segment is aligned one page after the ending address of the partition 1 of the instruction stream.

Once the address of each data segment has been aligned with the ending address of the corresponding partition, each partition is executed in proper sequence using associated processors of the set of processors (Step 172). The execution order of the partitions is enforced using the runtime execution facility and the data transfer facility. In accordance with an embodiment of the invention, each partition is executed using a thread corresponding to the particular partition, which thread is instantiated at runtime.

Referring back to FIG. 5, once each partition has completed execution, a determination is made as to whether partition 1 of the instruction stream or partition 2 of the instruction stream require repeated execution (Step 174). Certain types of programs, such as some types of simulation programs, are executed repeatedly. If partition 1 of the instruction stream and/or partition 2 of the instruction stream require repeated execution, Step 172 is repeated; otherwise, the process ends.

Figure 7:
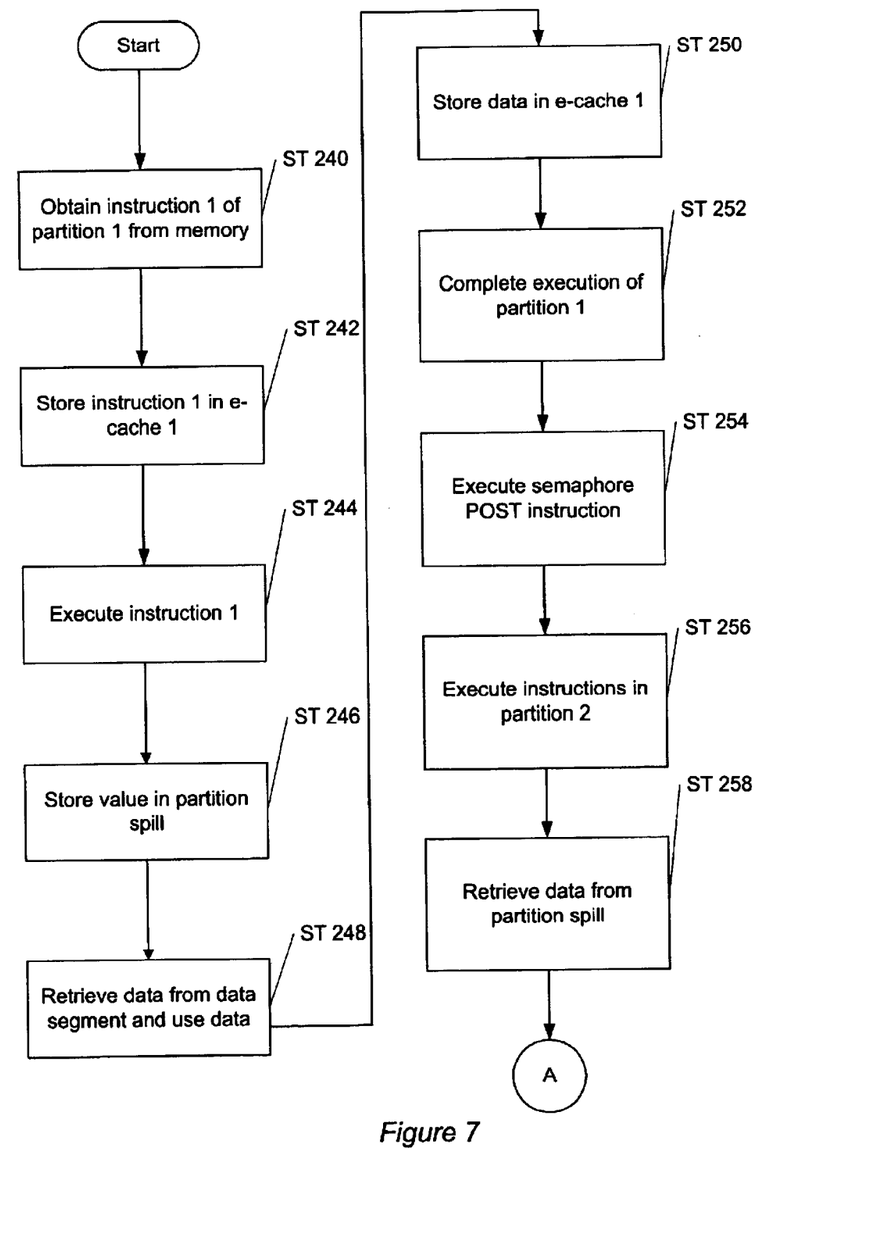
FIGS. 7–8 show a flowchart with exemplary operations associated with executing the set of partitions, in accordance with an embodiment of the invention.

FIG. 7 shows a flowchart representing examples of selected aspects of executing partitions (as shown in Step 172 of FIG. 5) when partition 1 of the instruction stream and partition 2 of the instruction stream require two iterations of execution. A first step includes processor 1 obtaining instruction 1 of partition 1 of the instruction stream from memory (Step 240). Those skilled in the art will appreciate that before instruction 1 is retrieved from memory, attempted retrievals from one or more caches (e.g., the on-board cache and the corresponding e-cache) resulted in misses. Once retrieved from memory, instruction 1 is stored in the e-cache 1 at a cache line that maps to the address from where instruction 1 was retrieved (Step 242). Processor 1 then executes instruction 1 of partition 1 of the instruction stream (Step 244). A value of a variable generated by execution of instruction 1 is stored in the partition spill (Step 246). The STORE instruction, when executed by processor 1, causes the value of the variable to be stored in the partition spill.

When processor 1 requires data from the data segment, processor 1 retrieves and uses the data from the data segment in memory (Step 248). For example, processor 1 may retrieve the data stored at address 10001H in memory. Once retrieved from memory, the data is stored in the e-cache 1 at the line that maps to address 10001H (Step 250).

Processor 1 completes execution of each instruction in partition 1 of the instruction stream (Step 252), and then executes a semaphore POST instruction (Step 254). Upon execution of the semaphore post instruction, processor 2, which had been waiting for the semaphore POST instruction, executes each instruction in partition 2 of the instruction stream (Step 256). A STORE instruction in partition 2 of the instruction stream causes processor 2 to retrieve the data from the partition spill that was stored by execution of partition 1 of the instruction stream (Step 258).

Figure 8:
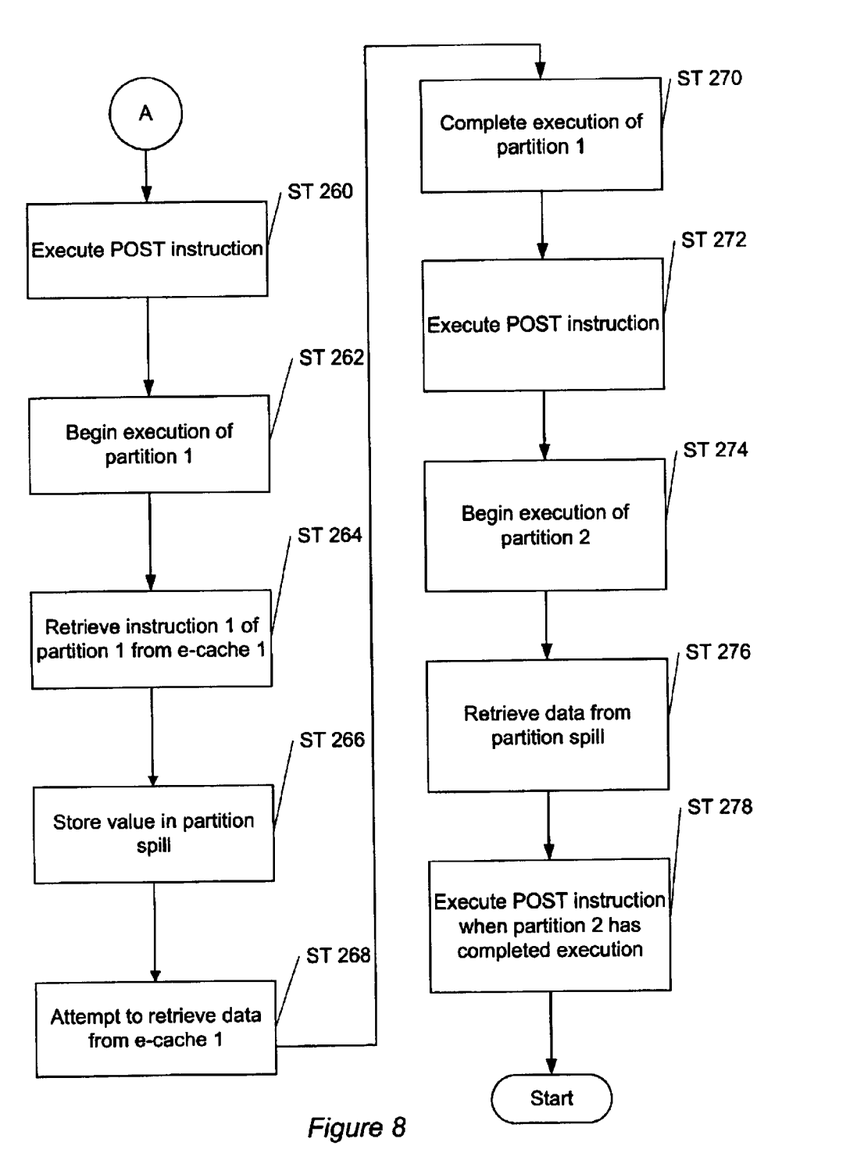

As shown in FIG. 8, when partition 2 of the instruction stream has been executed, processor 2 executes a semaphore POST instruction (Step 260), and processor 1 begins execution of partition 1 of the instruction stream (262). In order to execute instruction 1 of partition 1 of the instruction stream, processor 1 retrieves instruction 1 of partition 1 of the instruction stream from e-cache 1 (Step 264). Those skilled in the art will appreciate that processor 1 unsuccessfully attempts to retrieve instruction 1 from the on-board cache before retrieving instruction 1 from e-cache 1.

A value of a variable generated by execution of instruction 1 is stored in the partition spill (Step 266). The STORE instruction, when executed by processor 1, causes the value of the variable to be stored in the partition spill.

When processor 1 requires data from the data segment, processor 1 attempts to retrieve the data from the particular e-cache 1 line that maps to memory address 10001H (Step 268), and if successful uses the data. Processor 1 then completes execution of partition 1 of the instruction stream (Step 270), and then executes a semaphore POST instruction (Step 272). Upon execution of the semaphore post instruction, processor 2, which had been waiting for the semaphore POST instruction, begins execution of partition 2 of the instruction stream (Step 274). A STORE instruction in partition 2 of the instruction stream causes processor 2 to retrieve the data from the partition spill that was stored by execution of partition 1 of the instruction stream (Step 276). When partition 2 of the instruction stream has been executed, processor 2 executes a semaphore POST instruction (Step 278). Because, for this example, the number of iterations is set to 2, the process ends.

Advantages of various embodiments of the present invention may include one or more of the following. In one or more embodiments, the invention improves efficiency of a program by allowing a reduction in delays caused by fetching cache lines from memory, and thus enhancing execution speed of the program. Furthermore, because the instruction is smaller in size than the e-cache, when programs execute repeatedly, a reduced cache miss rate may be realized. Additionally, by aligning the data segment used for execution of the program, when retrieved from memory, the data segment is cached in cache lines that are not used for caching instructions, thus reducing miss rate.

Furthermore, because, in accordance with an embodiment of the invention, more than one partition of the same instruction stream may be associated with a processor, throughput may be increased. Therefore, in order to enhance throughput, a first partition of the instruction stream may execute on a first processor, followed by execution of a second partition on a second processor. However, while the second partition is being executed on the second processor, instead of the first processor being idled, a third partition is executed on the first processor. Thus, the first processor and the second processor are used to simultaneously execute partitions of the instruction stream, instead of being idled, thereby enhancing throughput.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for executing an instruction stream, comprising:
    partitioning the instruction stream using a partition point to obtain a first partition of the instruction stream and a second partition of the instruction stream;
    configuring the first partition and the second partition to fit separate e-caches;
    analyzing the first partition and the second partition to generate a runtime execution facility and a data transfer facility; and
    executing the first partition and the second partition on separate processors using the runtime execution facility and the data transfer facility.

2. The method of claim 1, wherein the second partition executes after the first partition.

3. The method of claim 2, wherein the second partition executes simultaneously with the first partition.

4. The method of claim 2, further comprising:
    storing the first partition and the second partition at separate addresses in a memory.

5. The method of claim 4, further comprising:
    retrieving the first partition and the second partition from the memory;
    storing the first partition and the second partition in the separate e-caches; and
    aligning a data segment in the memory.

6. The method of claim 5, further comprising:
    retrieving the first partition and the second partition from the separate e-caches.

7. The method of claim 1, further comprising:
    generating a plurality of basic blocks by analyzing the instruction stream, wherein the plurality of basic blocks is used in partitioning the instruction stream; and
    assigning the first partition to a first processor and assigning the second partition to a second processor.

8. The method of claim 7, wherein partitioning the instruction stream comprises:
    locating a stride block within the instruction stream; and
    locating the partition point within the stride block.

9. The method of claim 8, wherein the partition point comprises an instruction of an unconditional basic block.

10. The method of claim 1, wherein generating the runtime execution facility comprises:
    determining an execution order of the first partition and the second partition;
    generating an instruction to enforce execution order of the first partition and the second partition; and
    inserting the instruction into the second partition.

11. The method of claim 10, wherein the instruction implements a semaphore.

12. The method of claim 1, wherein generating the data transfer facility comprises:
    adding a STORE instruction to the first partition and adding a LOAD instruction to the second partition; and
    allocating memory for a partition spill used for executing the first partition and the second partition.

13. The method of claim 12, wherein generating the data transfer facility comprises:
    executing the STORE instruction and the LOAD instruction to make data available for execution of the second partition.

14. The method of claim 1, wherein a size of the instruction stream is greater than a size of the e-cache.

15. A method for executing an instruction stream, comprising:
    partitioning the instruction stream using a partition point to obtain a first partition of the instruction stream and a second partition of the instruction stream;
    configuring the first partition and the second partition to fit separate e-caches;
    analyzing the first partition and the second partition to generate a runtime execution facility and a data transfer facility;
    executing the first partition and the second partition on separate processors using the runtime execution facility and the data transfer facility;
    retrieving the first partition and the second partition from the memory;
    storing the first partition and the second partition in the separate e-caches;
    aligning a data segment in the memory; and
    retrieving the first partition and the second partition from the separate e-caches.

16. A system for executing an instruction stream, comprising:
    a partitioning program configured to partition the instruction stream into a first partition of the instruction stream and a second partition of the instruction stream, store the first partition at a first address in a memory, and store the second partition at a second address in the memory;
    wherein the first partition and the second partition are fitted to separate e-caches by the partitioning program;
    a runtime execution facility configured to enforce execution order of the first partition and the second partition; and
    a data transfer facility configured to transfer data required by execution of the second partition and supplied by execution of the first partition.

17. The system of claim 16, further comprising:
    a data segment in memory aligned with a third address in the memory.

18. The system of claim 16, wherein the runtime execution facility comprises a semaphore.

19. The system of claim 16, wherein the data transfer facility comprises a STORE instruction, a LOAD instruction, and a partition spill.

20. The system of claim 16, wherein a size of a first e-cache of the separate e-caches is greater than a size of the first partition.

21. The system of claim 16, further comprising:
    a third partition of the instruction stream fitted to the first e-cache.

22. The system of claim 16, wherein the first partition is included in a stride block.

23. A system for executing an instruction stream, comprising:
    a partitioning program configured to partition the instruction stream into a first partition of the instruction stream and a second partition of the instruction stream, store the first partition at a first address in a memory, and store the second partition at a second address in the memory;

wherein the first partition and the second partition are fitted to separate e-caches by the partitioning program;

a runtime execution facility configured to enforce execution order of the first partition and the second partition;

a data transfer facility configured to transfer data required by execution of the second partition and supplied by execution of the first partition; and a data segment in memory aligned with a third address in the memory.

24. An apparatus for executing an instruction stream, comprising:

means for partitioning the instruction stream using a partition point to obtain a first partition of the instruction stream and a second partition of the instruction stream;

means for configuring the first partition and the second partition to fit separate e-caches;

means for analyzing the first partition and the second partition to generate a runtime execution facility and a data transfer facility; and means for executing the first partition and the second partition on separate processors using the runtime execution facility and the data transfer facility.

* * * * *